(No Model.) 7 Sheets—Sheet 2.

A. R. GUSTAFSON.
THRASHING MACHINE.

No. 510,253. Patented Dec. 5, 1893.

(No Model.) 7 Sheets—Sheet 4.

A. R. GUSTAFSON.
THRASHING MACHINE.

No. 510,253. Patented Dec. 5, 1893.

Witnesses
Geo. W. Young.
N. E. Oliphant

Inventor
Axel R. Gustafson
By H. G. Underwood
Attorneys

THE NATIONAL LITHOGRAPHING COMPANY,
WASHINGTON, D. C.

(No Model.) 7 Sheets—Sheet 6.

A. R. GUSTAFSON.
THRASHING MACHINE.

No. 510,253. Patented Dec. 5, 1893.

Witnesses
Geo. W. Young
N. E. Oliphant

Inventor
Axel R. Gustafson
By H. G. Underwood
Attorneys (No Model.) 7 Sheets—Sheet 7.
A. R. GUSTAFSON.
THRASHING MACHINE.
No. 510,253. Patented Dec. 5, 1893.
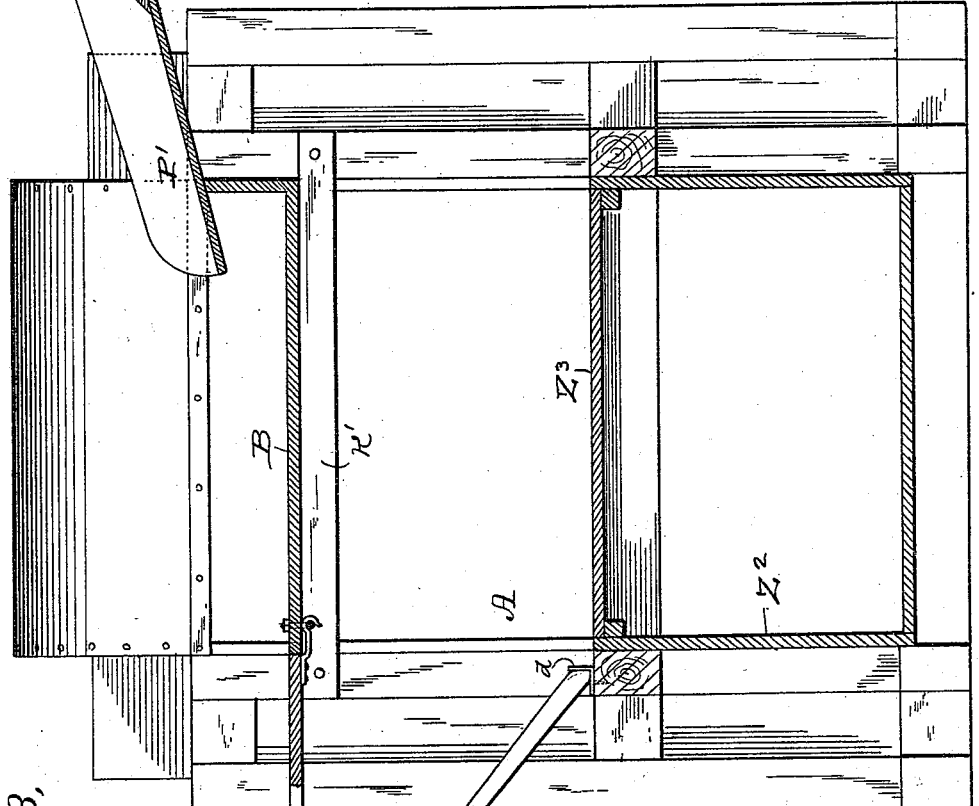
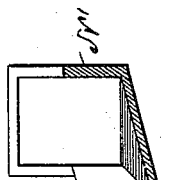
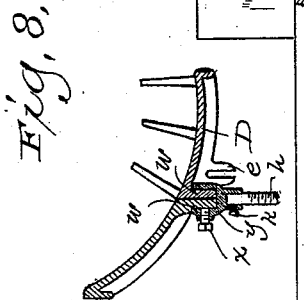
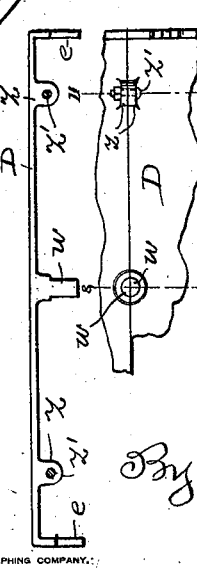
Witnesses
Geo. W. Young.
N. E. Oliphant
Inventor
Axel R. Gustafson
By H. G. Underwood
Attorney

UNITED STATES PATENT OFFICE.

AXEL R. GUSTAFSON, OF MILWAUKEE, WISCONSIN, ASSIGNOR OF ONE-HALF TO WILLIAM F. ANDERSON, OF NEGAUNEE, MICHIGAN.

THRASHING-MACHINE.

SPECIFICATION forming part of Letters Patent No. 510,253, dated December 5, 1893.

Application filed June 11, 1891. Serial No. 395,873. (No model.)

*To all whom it may concern:*

Be it known that I, AXEL R. GUSTAFSON, a citizen of the United States, and a resident of Milwaukee, in the county of Milwaukee, and in the State of Wisconsin, have invented certain new and useful Improvements in Thrashing-Machines; and I do hereby declare that the following is a full, clear, and exact description thereof.

My invention consists in certain peculiarities of construction and combination of parts to be hereinafter described with reference to the accompanying drawings and subsequently claimed.

Figure 1:
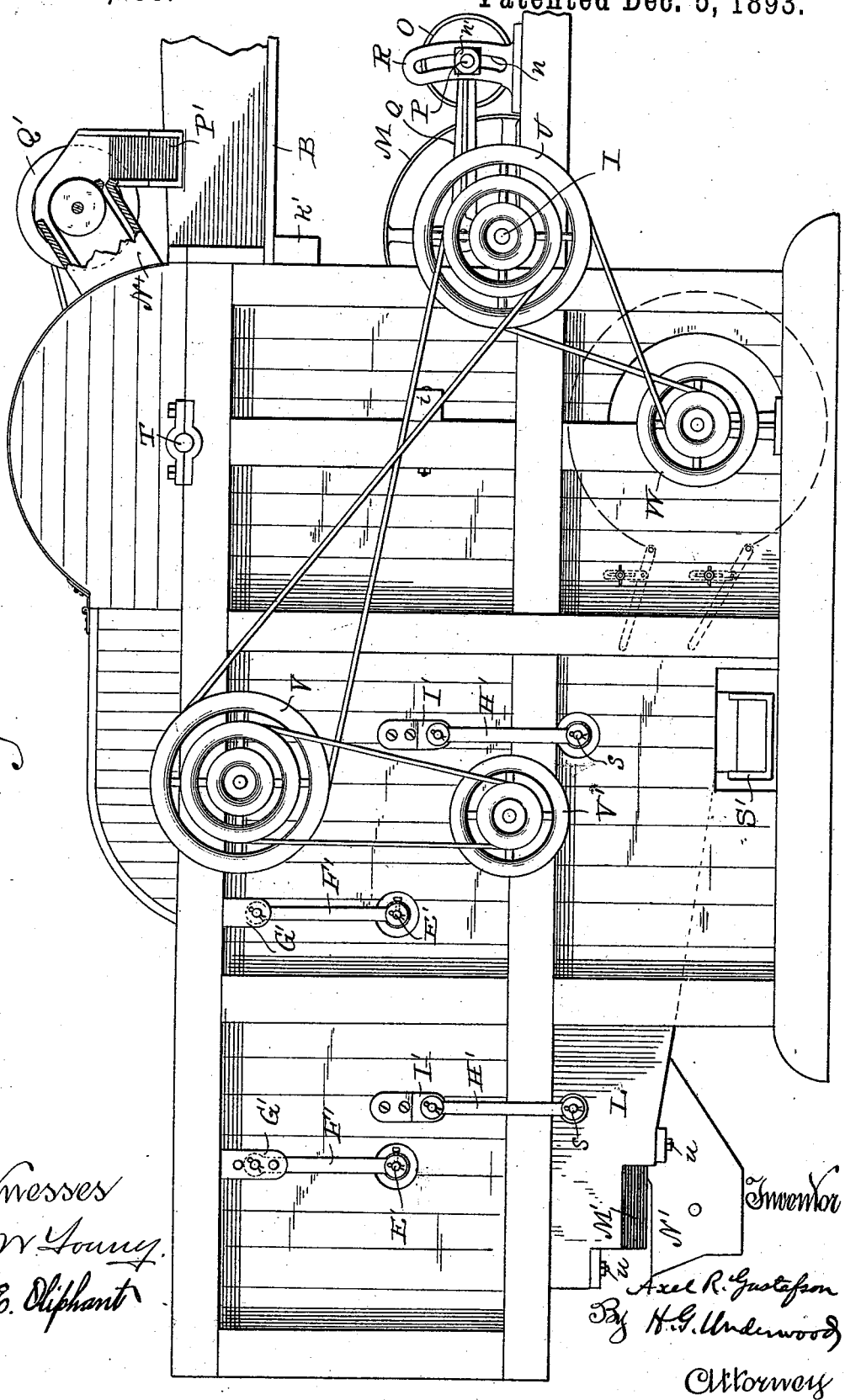
Figure 2:
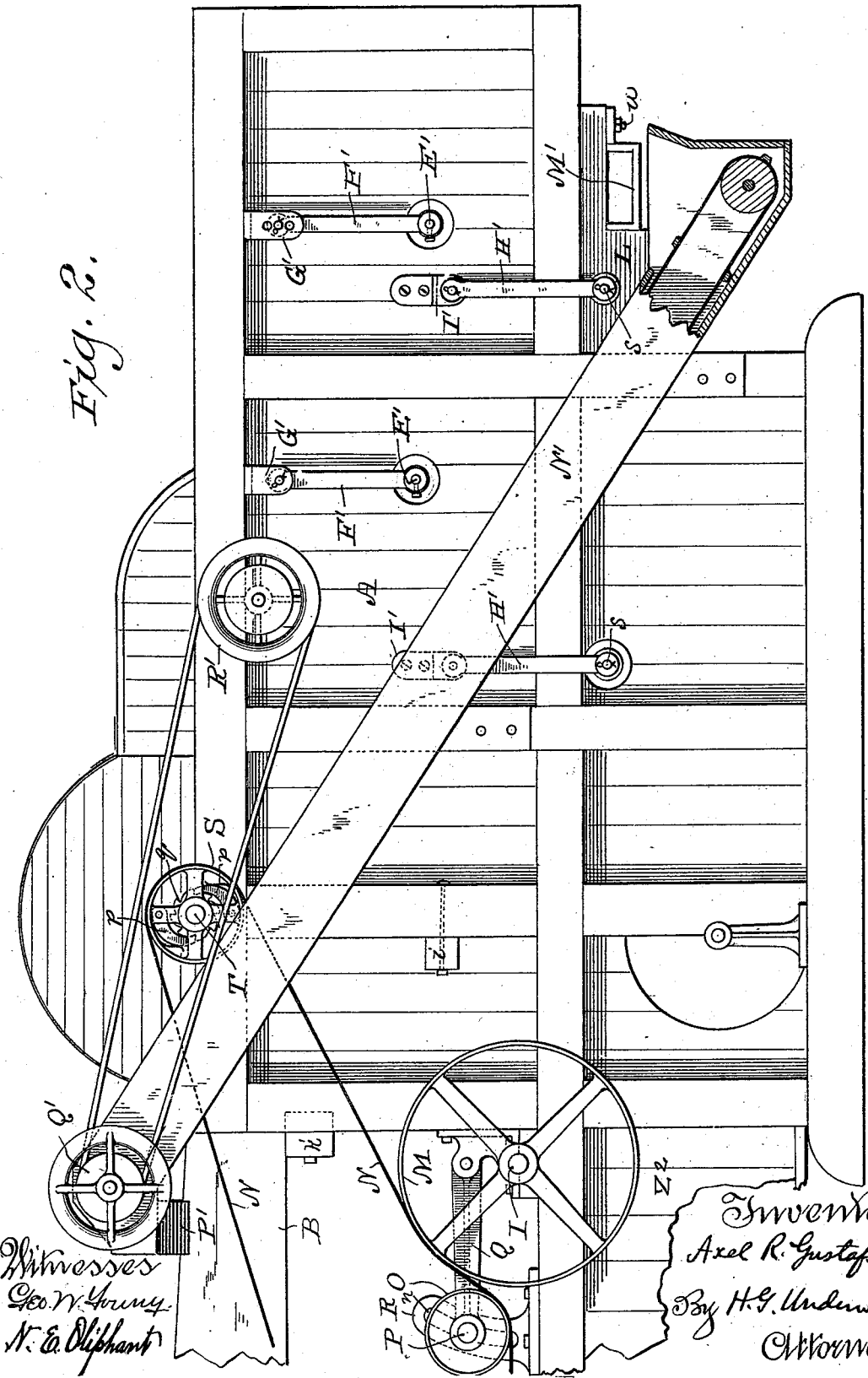
Figure 3:
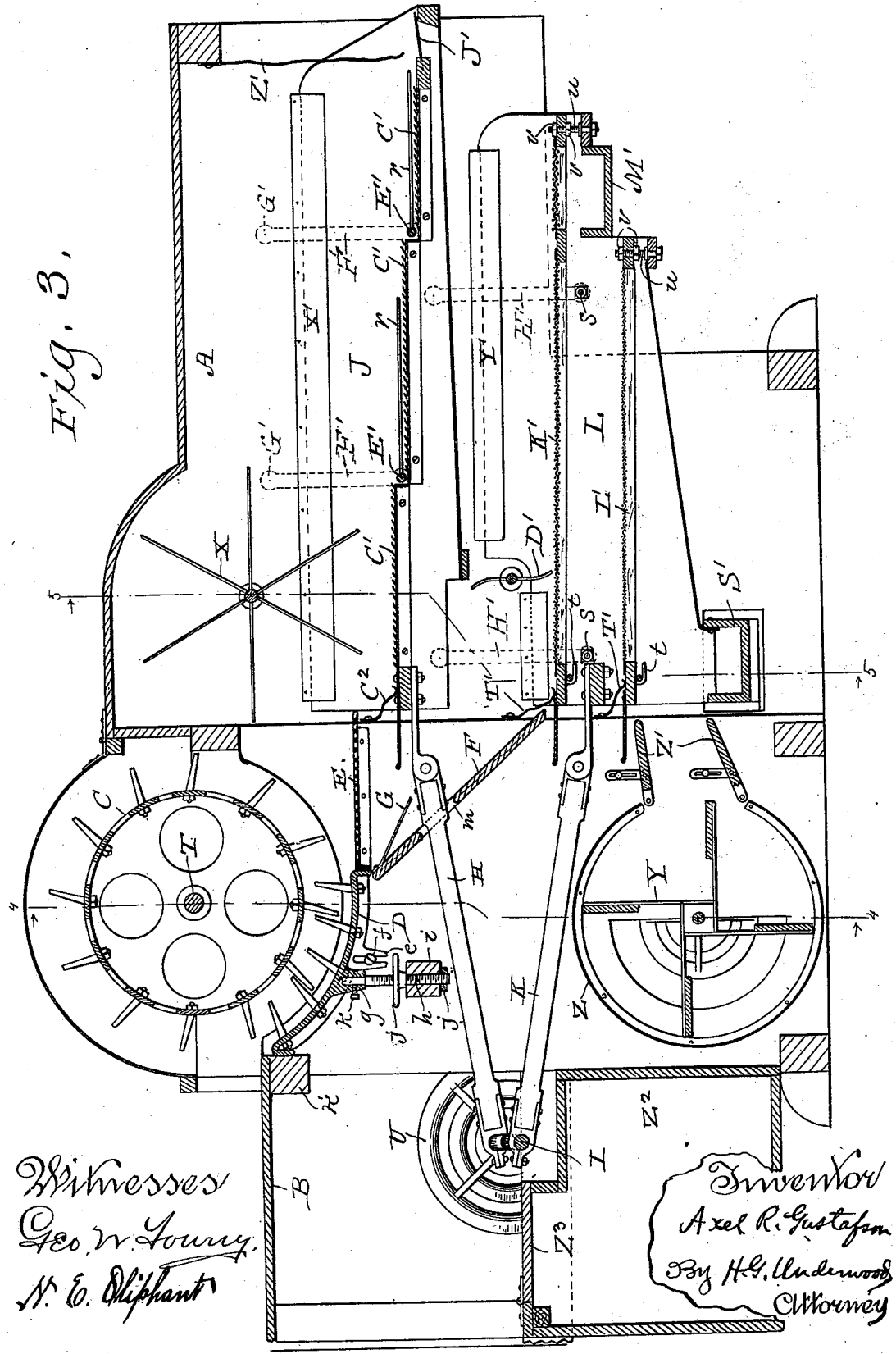
Figure 4:
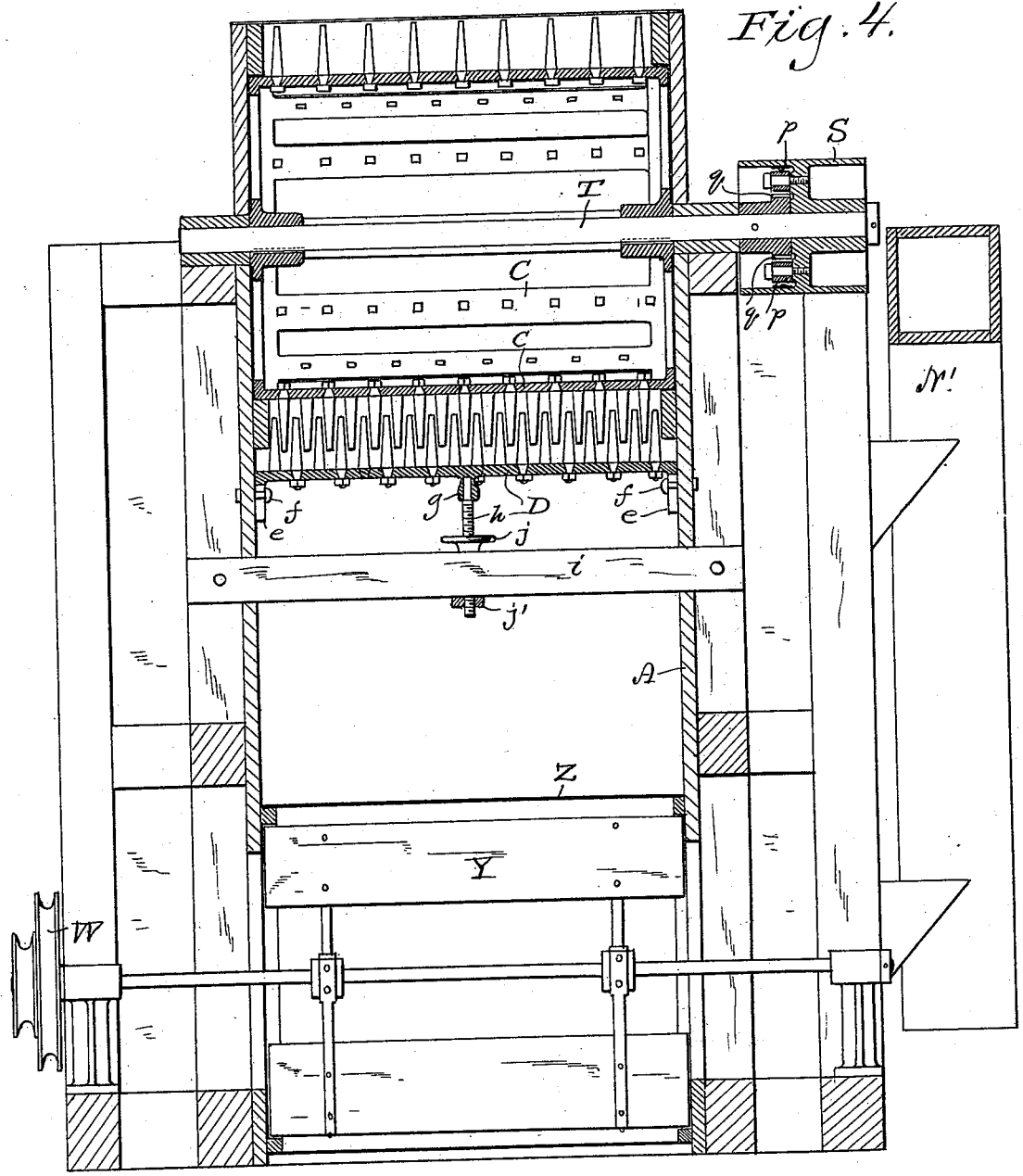
Figure 5:
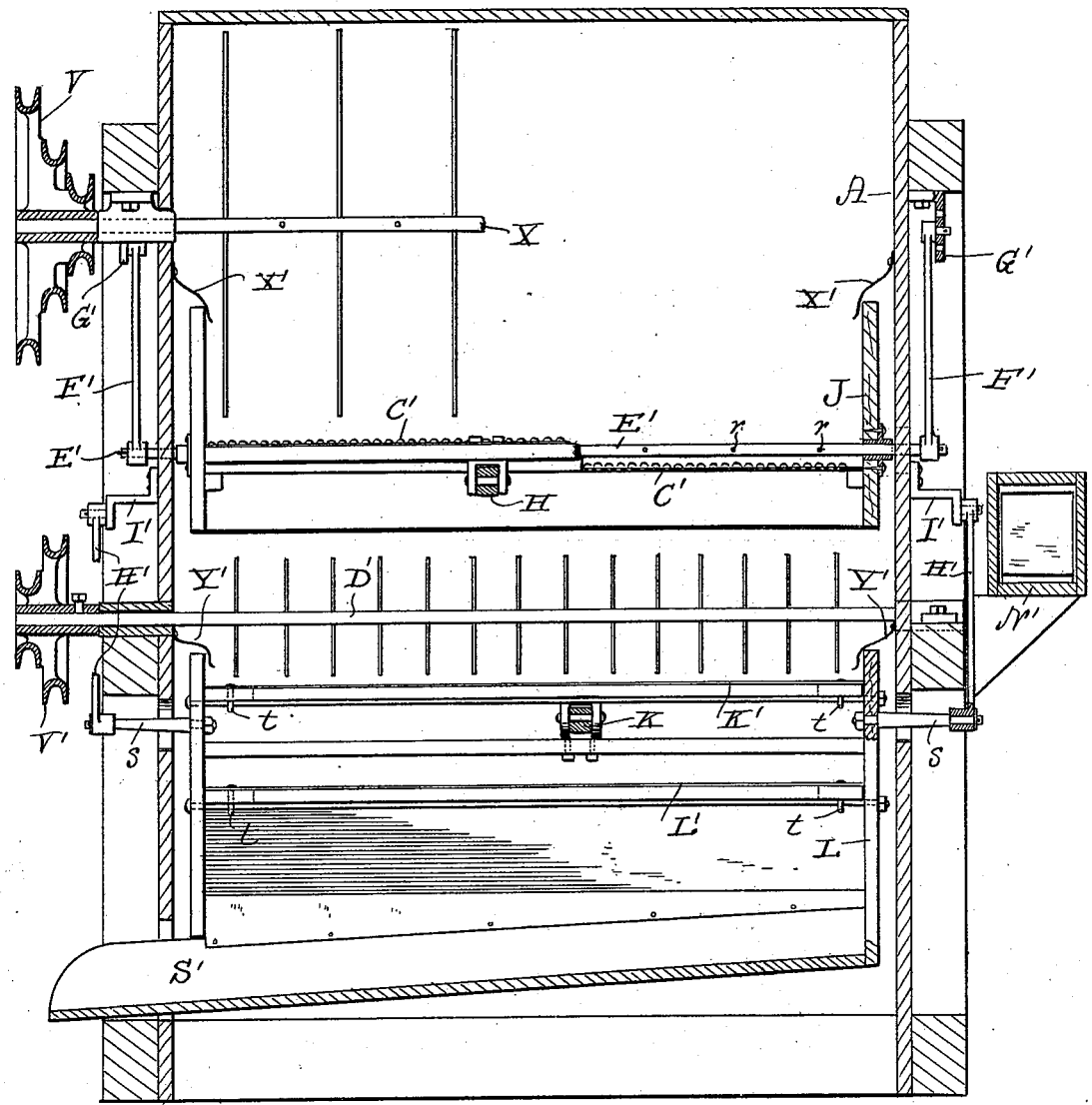
Figure 6:
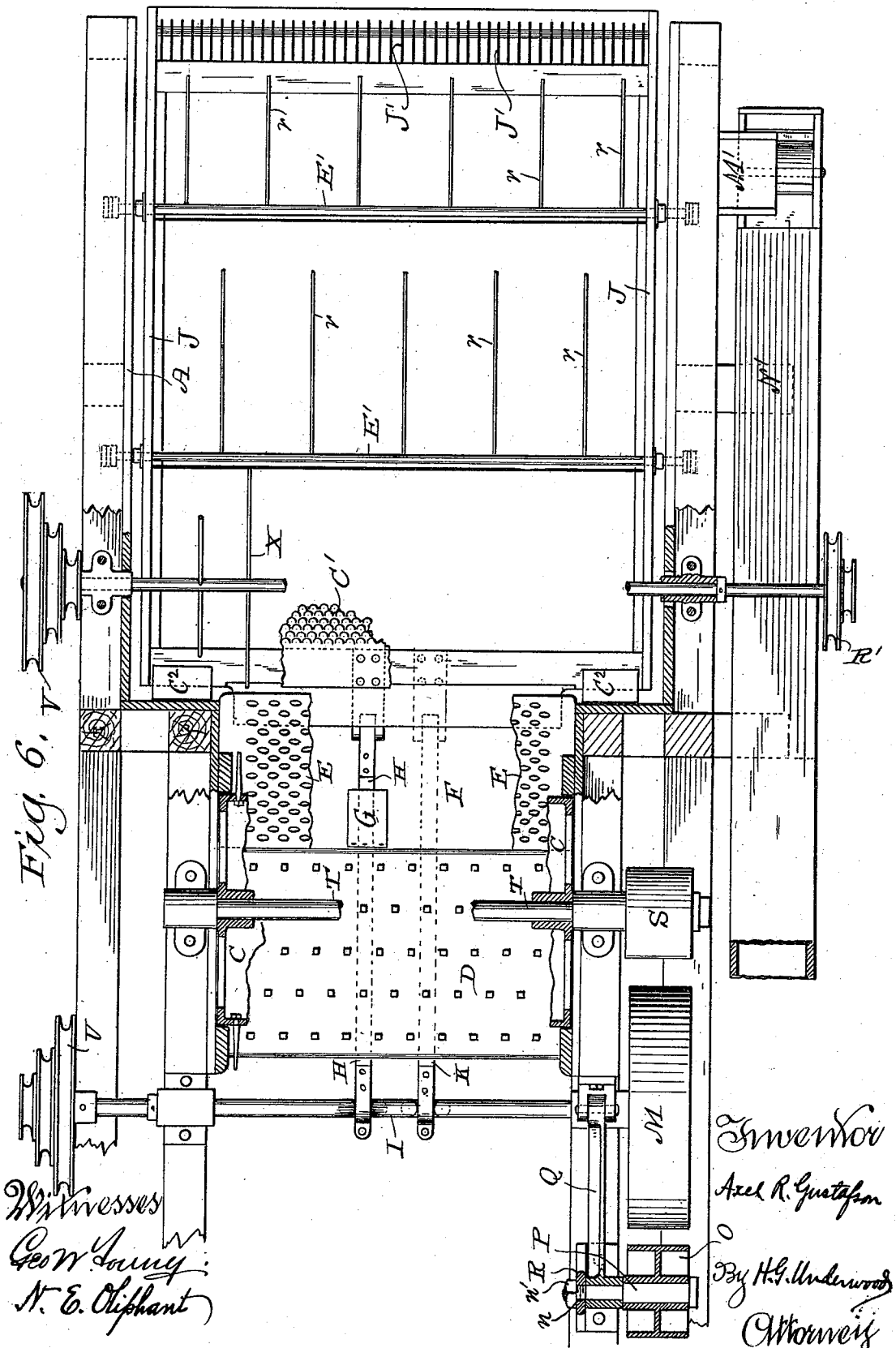

In the drawings: Figure 1 represents an elevation of one side of my machine; Fig. 2, a similar view of the opposite side of the same; Fig. 3, a vertical longitudinal section of the machine; Figs. 4 and 5 vertical transverse sections, respectively, taken on lines 4—4 and 5—5 of the preceding figure; Fig. 6 a plan view of said machine with the top thereof removed and certain of the parts broken away; Fig. 7 an elevation of the feed end of aforesaid machine partly in vertical transverse section, and Figs. 8, 9, 10 and 11 detail views of one form of a concave employed in my machine.

Referring by letter to the drawings, A represents the main casing of my machine, B the feed-table provided with a hinged leaf B', the latter being provided upon its under side with a toothed plate $b$ for engagement with a supporting brace $c$ that rests in a seat $d$ on said main casing, this construction and arrangement of parts permitting of an adjustment of the table leaf to different angles.

The cylinder C of the machine may be of any suitable construction, but the one shown, and preferred, has the heads and tooth-bars thereof cast in one piece, the teeth-shank openings in said bars being formed by coring the mold for said cylinder.

The construction just described forms the basis for a separate application for patent filed February 7, 1891, Serial No. 380,570, and is therefore not made the subject of claims in the present case.

The concave D of the machine has slotted ears $e$ that depend therefrom and engage lugs or guide-bolts $f$ at the sides of the main casing and, as shown in Figs. 3 and 4, a central socket $g$ depending from said concave engages one end of an adjusting screw $h$ that extends through a cross-brace $i$ of said casing and is provided with nuts $j\,j'$ that impinge against opposite sides of the cross-brace, said adjusting screw being detachably held within the concave socket by a set-screw $k$ as illustrated in Fig. 3. The front edge of the concave works against a cross timber $k'$ of the main casing and below this timber there is sufficient space to permit of the withdrawal of said concave when the latter is run down and detached from its adjusting screw, this operation being accomplished without the removal of the cylinder.

Rearwardly extended from the concave is a perforated horizontal plate E and below this perforated plate is an inclined wall F, the latter being provided with a shield G at an angle thereto. The shield prevents material, that falls through the plate E, from escaping through an opening $m$ in the inclined wall F, this opening being for the passage of a pitman H connecting a crank-shaft I with a shoe J, and another pitman K, below said inclined wall, connects the crank-shaft with another shoe L, as clearly illustrated in Fig. 3.

At one side of the machine, the crank-shaft I is provided with a pulley M in frictional contact with a driving belt N, the latter being held to its work by a tightener pulley O that has its shaft P supported in the outer end of an arm Q pivoted to the main-casing, and as best illustrated in Figs. 1, 2, and 6, the shaft P is adjustable, as to elevation, within a segmental slot $n$ in a standard R on one of the timbers of said main casing, a set-nut $n'$ being employed to hold said shaft in its adjusted position. The belt N runs over a pulley S that is loose on the cylinder-shaft T and provided with pawls $p$ that engage ratchet-teeth $q$ on said shaft, whereby the cylinder is prevented from running in the wrong direction, but is free to rotate by acquired momentum in case power is cut off from the machine, the ratchet-teeth in such an instance slipping past the pawls. Fast on that end of the crank-shaft I opposite the friction pulley M is a cone-pulley U that is belted to like pulleys V, W, respectively, arranged on the shafts of a beater X and fan Y, the beater being immediately in rear of the cylinder C and relative to the shoe J, while the fan is arranged in a casing Z within the main-casing, the discharge of air from the fan-casing being controlled and directed by pivotally adjustable leaves Z', as best illustrated in Fig. 3. The cone-pulley V is also belted to a similar pulley V' on another beater D, relative to the shoe L, and the speed of the beaters and fan is regulated by the adjustment of the belts on the respective pulleys V, W, V', all of the latter being clearly illustrated in Fig. 1.

The bottom of the shoe J is made up of fish-scale screen-plates C' at various elevations, the one toward the front of the machine being the highest and having a non-perforated portion extending under a transverse shield C², that serves as a guard to prevent material on the screen from working off at the front end thereof.

In rear of the screen plates C', the shoe J is provided with a grating J' through which the tailings from said screen-plates fall onto the inclined bottom of said shoe and are discharged into the shoe L, to be reacted upon.

Rods E' extend through the sides of the shoe J and out through openings in the sides of the main casing where they connect with arms F' pivotally connected to hangers G' on said main casing, and in order to vary the inclination of said shoe the rear pair of the arms are vertically adjustable on their hangers, the latter having a series of openings, one above the other, for engagement with the adjacent pivots of said arms. Extending from the rods E' toward the rear of the machine, and over the adjacent screen-plates, are fingers $r$ that beat the material on said screen-plates, and hereinafter the said rods and fingers may be taken collectively and termed beaters, the operation of the latter being due to the reciprocation of the shoe J by the pitman and crank-shaft connection above described.

The beater-rods E' are arranged adjacent to the risers between the screen-plates C' and are thus prevented from becoming clogged by the material passing from one to the other of said screen-plates.

The sides of the lower shoe L are provided with studs $s$ that engage arms H' pivotally connected to hangers I' on the main casing, and carried by the latter shoe are parallel screens K' L', of different mesh, that of the first being the coarser.

The front ends of the shoe L are provided with transverse supporting rods for engagement with hooks $t$ on the under sides of the front ends of the screens K', L', the rear ends of these screens being arranged on vertical screws $u$ and retained at different elevations by set nuts $v$ adjustable on said screws, as best illustrated in Fig. 3.

The rear end of the screen K' is of coarser mesh than the remaining portion thereof, and arranged directly over a transverse inclined trough M' forming part of the relative shoe, and tailings from said screen passing through the coarse rear portion thereof fall into the trough and are conducted thereby to an endless elevator N', on the outside of the main casing, to be carried up and delivered through a spout P' onto the feed-table to again pass through the machine, said elevator being actuated by means of a pulley Q' connected by a belt with another pulley R' on the shaft of the rotary beater X, as best illustrated in Fig. 2.

The shoe L has an inclined bottom plate leading to a delivery trough S' and the latter, in turn, leads to the outside of the main casing, as best illustrated in Fig. 5.

To prevent material from working off at the front ends of the screens K' L', the latter are provided with non-perforated extensions that extend under transverse guard-shields T', as best illustrated in Fig. 3. To prevent material from working off at the upper edges of the sides of the shoes J, L, guard-shields X' Y' are extended in from the adjacent sides of the main-casing, as best illustrated in Fig. 5, and to prevent straw, dirt or other rubbish from entering the machine above the screen-plates C' of the upper shoe, I suspend an apron Z' from the rear end of said main casing, as shown in Fig. 3.

At the front of the machine below the crank-shaft, I arrange a tool box Z² and provide the same with a hinged cover Z³, as best illustrated in Fig. 3.

In Figs. 8, 9 and 10, I show the concave D made in two sections one of which is without teeth, the meeting edges of these sections being provided with half-round lugs $w$ that unite to form a boss that is clamped by a set-screw $x$ within a socket $y$ held on the adjusting screw by the set-screw $k$ above described. The meeting edges of the concave sections are also provided with ears $z$ united by bolts $z'$, as shown in Figs. 10 and 11. By having the concave in sections as just described, I am enabled to reduce the number of teeth thereon whenever such reduction is necessary or desirable, and in case of fracture of one section of the concave there is less cost for repairs.

In the operation of my machine, the material to be thrashed is fed in between the cylinder C and concave D and acted upon by the teeth of these parts. The material passes on over the perforated plate E to the screen-plates C' of the reciprocating shoe J, and so much of the loose grain as may fall through said perforated plate is deposited on the upper coarse screen K' in the shoe L. The material in the shoe J is acted upon by the rotary beater X and rocking beaters E'. The loosened grain falling through the screen plates C' runs along the bottom of said shoe onto the upper screen K' in the lower reciprocating shoe L, the peculiar construction of said screen-plate preventing straw and chaff from clogging up the openings therein. The tailings from the screen-plates C' fall through the grating J' and are deposited on the screen K' of the shoe L, the material on the finer portion of this screen being stirred by the rotary beater D' to prevent clogging at the front of the same and the chaff and other light particles are blown away by the blast from the fan Y, this blast being regulated and directed as above described. The partially cleaned grain falls onto the lower screen L' to be relieved of such fine particles of chaff and dirt as may have passed the screen K' after which it falls onto the bottom of the shoe L and is delivered through the trough S' to the outside of the machine, the tailings from the screen K' being deposited in the trough M' and thus conducted to the elevator N' for the purpose above described. The mass of straw is discharged from the shoe J and may be carried away or stacked by any suitable means.

Having thus described my invention, what I claim as new, and desire to secure by Letters Patent, is—

1. The combination of the concave made in sections having their meeting edges provided with half round lugs that unite to form a boss, suitable means for detachably connecting the sections on opposite sides of the boss, a socket for the reception of said boss and an adjusting screw connected to the socket, substantially as set forth.

2. The combination of the driving-belt, a pivoted arm, a standard having a segmental slot therein, a shaft carried on the pivoted arm and engaging the standard-slot, a pulley loosely arranged on the shaft to impinge against said belt, and a set-nut on said shaft in opposition to the standard, substantially as set forth.

3. The combination with the thrashing mechanism and fan, of a reciprocative shoe having an inclined bottom and provided with screens in successive steps, a grating in rear of the lowermost screen, a rotary beater above the foremost screen, and a rocking beater above each of the remaining screens, another reciprocative shoe beneath the first and also provided with an inclined bottom, screens of different mesh arranged one above the other in the latter shoe, the rear of the first of these screens being coarser in mesh than the remaining portion thereof, a spout beneath this coarse portion of said screen, an elevator leading from the spout to the feed-table of the machine, and a delivery spout at the lowest point of the lower shoe, substantially as set forth.

4. The combination with the thrashing mechanism and fan, of a perforated horizontal plate extending rearward from said thrashing mechanism, an inclined wall arranged beneath the plate, a shield on the wall, pitmen extending through an opening in said wall below the shield, and a loosely hung screen shoe connected to each pitman, substantially as set forth.

5. The combination with the thrashing mechanism and fan, of a perforated horizontal plate extended rearward from said thrashing mechanism, an inclined wall arranged beneath the plate, a shield on the wall, pitmen extended through an opening in said wall below the shield, a loosely hung shoe connected to each pitman, screens arranged in the shoes at different elevations and having the highest one thereof in each shoe provided with a non-perforated portion extended forward beyond the line of said inclined wall, and a transverse shield arranged immediately above said non-perforate portion of the uppermost screen in each shoe, substantially as set forth.

In testimony that I claim the foregoing I have hereunto set my hand, at Milwaukee, in the county of Milwaukee and State of Wisconsin, in the presence of two witnesses.

AXEL R. GUSTAFSON.

Witnesses:
N. E. OLIPHANT,
WM. KLUG.